United States Patent [19]

Oltman et al.

[11] Patent Number: 4,591,539

[45] Date of Patent: May 27, 1986

[54] METAL-AIR CATHODE BUTTON CELL

[75] Inventors: John E. Oltman, Mt. Horeb; Denis D. Carpenter; Robert B. Dopp, both of Madison, all of Wis.

[73] Assignee: Rayovac Corporation, Madison, Wis.

[21] Appl. No.: 714,628

[22] Filed: Mar. 21, 1985

Related U.S. Application Data

[63] Continuation of Ser. No. 506,990, Jun. 23, 1983, abandoned.

[51] Int. Cl.⁴ ............................................. H01M 12/06
[52] U.S. Cl. ........................................ 429/27; 29/623.1
[58] Field of Search ....................... 429/27, 36, 38, 39, 429/72, 162, 164; 29/623.1

[56] References Cited

U.S. PATENT DOCUMENTS

| | | | |
|---|---|---|---|
| 3,432,358 | 3/1969 | Krusenstierna et al. | 429/39 |
| 3,467,553 | 9/1969 | White | 429/39 |
| 4,105,830 | 8/1978 | Kordesch | 429/27 |
| 4,181,776 | 1/1980 | Lindstrom | 429/39 |
| 4,262,062 | 4/1981 | Zatsky | 429/72 |
| 4,404,266 | 9/1983 | Smilanich | 429/27 |

Primary Examiner—Donald L. Walton
Attorney, Agent, or Firm—Kenyon & Kenyon

[57] ABSTRACT

A button cell having an air cathode assembly wherein grooves are constructed between the cathode and cell container to provide a gas diffusion passage from a port extending through the container to the face of the air cathode.

18 Claims, 9 Drawing Figures

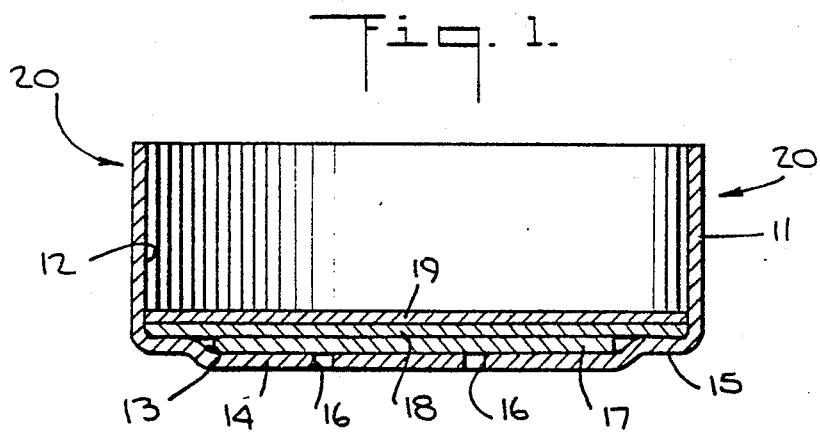
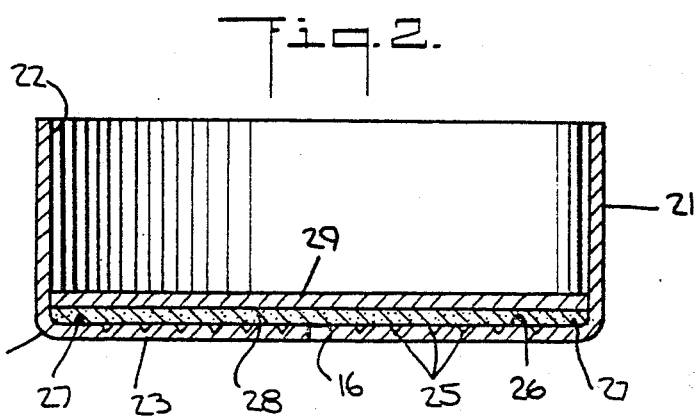
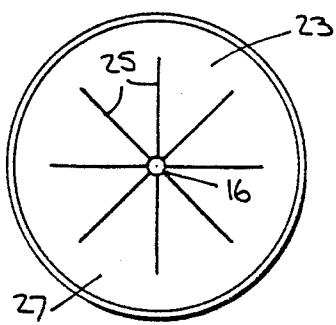 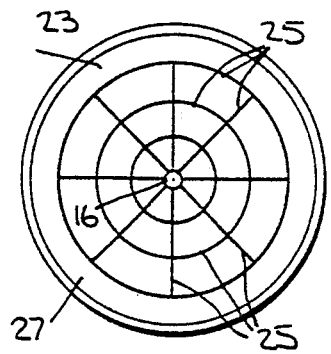 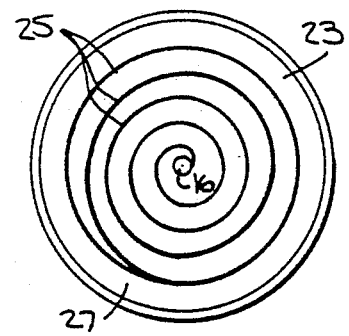
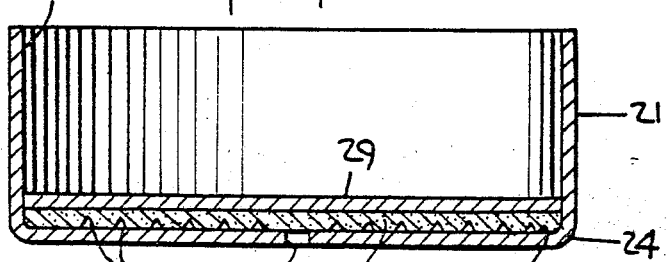

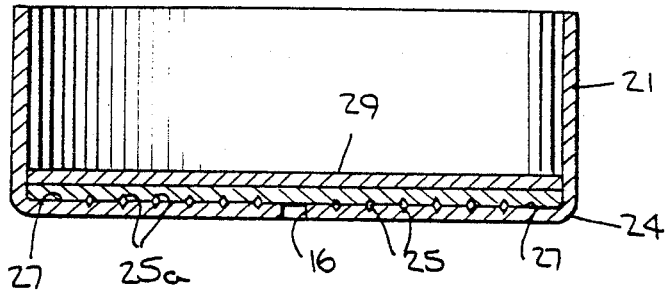
Fig. 7.
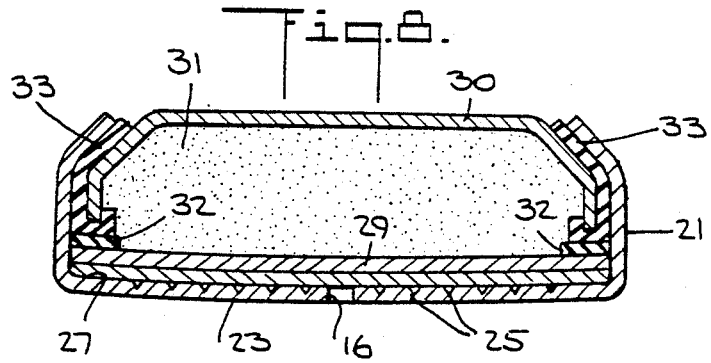
Fig. 8.
Fig. 9.
VOLTAGE RESPONSE TIME AFTER SEAL TAB REMOVAL
13 SIZE HEARING AID CELL
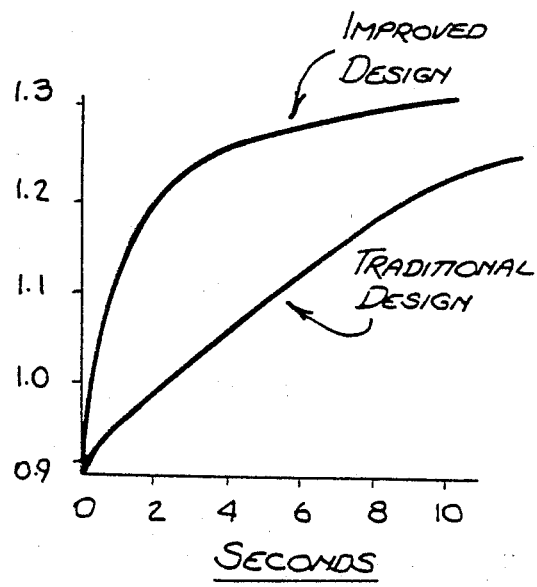

METAL-AIR CATHODE BUTTON CELL

This application is a continuation-in-part of Ser. No. 506,990, filed June 23, 1983, now abandoned.

FIELD OF INVENTION invention is concerned with electrochemical button cells commonly known as metal-air cells, and more particularly to an improved design which allows for simplified construction, increased capacity and reduced activation time of these cells.

BACKGROUND OF INVENTION

The recent increase in small electrically-powered devices has increased the demand for very small electrochemical cells, usually disc-like or pellet-like in appearance, commonly referred to as button cells. Such cells, which are approximately the size of garment buttons, have diameters ranging up to about 1.0 inch and heights ranging up to about 0.60 inches. Because of their minute size, the power generating electrochemical reactions in button cells must be efficient and complete. Additionally, button cells must be manufactured with substantial precision to meet the geometric tolerances of the electrical device and to avoid leakage of corrosive electrolytes.

When the button cell includes an air cathode assembly, i.e., a combination of structural and chemical features which permit the oxygen of the air to act as the cathode, manufacturing problems are compounded. Specifically, the cell must have at least one port through which air can enter the cell. The port must be isolated from the electrolyte. The seal which isolates the electrolyte must be sufficiently tight in order to resist the internal forces tending to force electrolyte through the seal which are present when the cell is closed and increase during cell usage. These internal forces which promote leakage increase during cell usage are not only due to elevated temperature and humidity environments, but also due to increases during use of the mass of the ingredients in the cell. Accordingly, it is important to manufacture air cathode cells with the precision and tolerances which will assure tight, pressure resistant seals over the life of the cells.

Normally, metal-air button cells are constructed in two steps; the anode section and the cathode section of button cells are usually separately assembled and then permanently sealed together as the final manufacturing step. Generally, the cathode section is contained in a topless, hollow metallic container having one or more parts so as to provide air access. An air cathode subassembly which contains a non-metallic barrier on the surface which contacts the anodic material and a hydrophobic layer on its opposite surface, is inserted in the cathode container to create an interference fit. The anode section usually consists of a topless, hollow metallic can into which a measured amount of a metallic anode is placed. An alkaline electrolyte is then metered directly onto the surface of the anode. After the electrodes have been made, they are joined by inverting the cathode section and placing it over the open end of the anode can. The button cell is then sealed, usually by crimping the edges into a non-metallic grommet so as to hold all of the components in the desired relationship to one another and to prevent leakage of the electrolyte.

It is well documented in the art that the failure to distribute the incoming air to a substantial portion of the available surface of the air cathode restricts the current capacity of a metal-air button cell. Therefore, in order to prevent this decrease in current capacity, air chambers have been routinely provided between the metal container and the air cathode of metal-air button cells. Such chambers are provided by stamping a step in the metal container or by inserting a sealing washer between the container and air cathode.

The incorporation of a step for this purpose is taught by U.S. Pat. No. 3,897,265. In order to prevent the air cathode from pressing into this chamber, a porous diffusion member is often placed therein and held in place with a drop of adhesive. In practice, steps of this type have an approximate height of 0.008 inches to 0.015 inches and consume a significant percent (10–22%) of the total internal volume of the cell.

The use of a seal washer placed between the metal container and the air cathode so as to form an air chamber is taught and claimed in U.S. Pat. No. 4,404,266. According to those teachings, since one purpose of the washer is to improve the cell seal so as to prevent electrolyte leakage from the cell, the washer is coated with adhesive sealants such as polyamids, asphalt, etc. The thickness of the washer may vary from 0.01 inches to 0.025 inches. U.S. Pat. No. 4,404,266 teaches that it is preferable to place a porous material within the seal washer. The manufacture and handling of a relatively thin adhesive-coated washer and the placement of a porous material within it is both difficult and expensive and has yet to be demonstrated practical via commercialization.

In the manufacture of button cells, it is imperative to use as much of the available internal volume of the cell for the reactive consumable materials. Because of the size of button cells, the failure to maximize the amount of active materials consumed by the electrochemical reactions will result in cell lives that do not meet reasonable consumer expectations. An increase in cell capacity due to an increase in available internal cell volume is more dramatic in metal-air cells than in other button cell systems. In metal-air cells the cathode is catalytic and not consumable; consequently only metallic anodic material and electrolyte need to be added to provide additional capacity. In other cell systems a consumable cathodic material must be increased along with the anodic material and the electrolyte in order to increase the cell capacity.

A draw back to the use of metal-air button cells in some applications has been the time required for the activation of the cells. In storage, before first usage, a metal-air button cell normally has a seal over the air entry ports. When the cell is put into use, the seal, e.g., a piece of adhesive tape, is removed, and the cell is put into the device which it powers. The time between removal of the seal and the start of generation of power at the level required by the device should be as short as possible. Failure to activate rapidly often results in customer dissatisfaction, since the customer will perceive that the cell is dead when in fact it is not.

Because of the aforementioned increase in the demand for button cells, metal-air button cells must be manufactured inexpensively and in large volumes. Therefore, the judicious implementation of engineering principles which obviates the need for exotic, expensive or slow-acting solutions to the problems associated with metal-air button cells are required.

It is an objective of the present invention to provide a method to inexpensively manufacture large volumes of metal-air button cells by reducing the number of parts and the number of steps required in the manufacture of such metal-air cells. Another objective of the present invention is to provide a metal-air cell which maximizes the internal cell volume available for anodic material within a metal-air button cell of given external dimensions. Still another objective of the present invention provide a metal-air cell which reduces the time required for the activation of metal-air cells once they are put into service. These objectives and other subsidiary objectives are achieved by the practice of the present invention.

SUMMARY OF THE INVENTION

The present invention provides for a button cell having an air cathode in which the air cathode assembly is positioned directly against an essentially flat can bottom having one or more air entry ports and is in sealing configuration against its periphery. Centerward from a peripheral sealing area either the can bottom or the abutting surface of the air cathode assembly or both is or are grooved to provide a pattern of grooves terminating at the edge of the peripheral sealing area and communicating with the air entry port to provide gas passages. These passages allow air from said entry port to contact said abutting surface of the air cathode assembly over a much extended area compared to the cross-sectional area of said air entry port.

BRIEF DESCRIPTION OF THE DRAWINGS

FIG. 1 is a cross-sectional view of the cathode can structure used in the prior art.

FIG. 2 is a cross-sectional view of a cathode can structure of cells of the present invention.

FIGS. 3 to 5 are plain views of groove patterns useful in the cells of the present invention.

FIGS. 6 and 7 are cross-sectional views of alternative cathode can structures of cells of the present invention.

FIG. 8 is a cross-sectional view of a cell of the present invention.

FIG. 9 is a graph illustrating comparative voltage response times between a traditionally designed cell and a cell of the present invention.

DETAILED DESCRIPTION OF THE INVENTION

In carrying out the present invention one provides, as depicted in FIG. 2, a cathode can 21 comprising a hollow cylinder 22 enclosed at one end by bottom 23 joined to said cylinder 22 in an essentially square, unstepped manner at joint 24. Bottom 23 contains air entry port 16 as in the cans of prior practice. Grooves 25, in a waffle pattern, are provided inside face 26 of can bottom 23 centerward of planar, sealing surface 27 which extends completely around the inside periphery of can bottom 23. While not shown in FIG. 2, grooves 25 communicate with air entry port 16 to provide air channels which are in direct contact with a widespread area of the hydrophobic surface 28 of air cathode 29. FIGS. 3, 4 and 5 show, on a reduced scale, operable groove patterns for the can bottoms of the cells of the present invention. Each of FIGS. 3, 4 and 5 shows that grooves 25 occupy or are placed in the central region of can bottoms 23 leaving peripheral areas 27 ungrooved.

FIG. 6 depicts an alternative construction in which cathode can 21 having hollow cylindrical structure 22 integral with flat bottom 23 containing air port 16 has a flat interior surface, but is abutted by an air cathode structure 29, the hydrophobic layer 28 of which contains centrally located grooves 25a and flat peripheral area 27 adapted for pressure sealing. A still further alternative construction is depicted in FIG. 7, which combines the can grooves 25 of FIG. 2 and the hydrophobic layer grooves 25a of FIG. 6. As in each of the aforedescribed alternative constructions, peripheral flat abutting areas 27 are provided for sealing purposes.

A completed cell is depicted in FIG. 8. Referring now thereto, cathode can 21, having at least one port 16, and having grooves 25 in bottom 23 thereof, is assembled with air cathode 29 along with anode container 30. Anode container 30 contains anode-electrolyte mass 31, e.g., powdered zinc in aqueous KOH electrolyte and is assembled such that the periphery of the open end thereof is pressed upon insulating ring and the body thereof is electrically isolated from cathode can 21 by grommet material 33 which is squeezed between cathode can 21 inner surface and the outer surface of anode container 30 by deformation of cathode can 21. Those skilled in the art will understand that since cathode can 21 is made of a deformable metal such as nickel plated steel, deformation of cathode can 21 to enclose and entrap anode container 30 will usually cause a slight, convex curvature of bottom 23 in the assembled cell. The cell, as depicted in FIG. 8, is advantageous in that compared to metal-air cells of prior practice, it may be made en masse with less difficulty and less defects due to out of tolerance product. The cell of the present invention is also characterized by a greater amount of anode material in any given cell size compared to cells of common prior practice.

The grooves which may be embossed into the base of the cell container during the forming operation serve to distribute the air with adequate uniformity to a substantial portion of the surface of the air cathode. These grooves may be 0.0005 inches to 0.004 inches deep, 0.001 inches to 0.005 inches wide and have repeat dimensions of 0.005 inches to 0.020 inches. While these grooves effectively distribute air to a substantial portion of the surface of air cathode, essentially no internal cell volume is used for the function. Table I details the amount of the internal cell volume of common metal-air hearing aid button cells which is used when a chamber is provided to distribute air to the air cathode.

TABLE I

| INTERNAL CELL VOLUME USED FOR AIR DISTRIBUTION | |
|---|---|
| CELL SIZE | PERCENTAGE |
| 675 | 10.3 |
| 13 | 12.0 |
| 312 | 22.1 |

By following the teachings of the present invention herein, comparable increases in cell capacity can be realized.

The elimination of an air chamber reduces the number of components to be assembled, and simplifies the manufacturing process, for metal-air button cells. For example, the stamping of a step in the cathode can and the use of porous blotter material and a drop of adhesive as taught by U.S. Pat. No. 3,897,265 are eliminated. Similarly, the adhesive coated seal washer and the porous blotter material necessary to form the chamber taught by U.S. Pat. No. 4,404,266 are not needed. The reduction in the number of components means that metal-air cells of the present invention can be more easily, and less expensively, manufactured. Similarly, fewer components allow for the more precise manufacturing of metal-air cells which results in the production of fewer cells not meeting performance specifications.

As previously stated, porous materials such as a diffusion pad or blotter paper has traditionally been placed in the air chamber in order to maintain the structural integrity of the chamber. While the integrity of the chamber is maintained, such materials restrict the initial access of air to the air cathode which increases the time required for the cell voltage to come to a functional level (1.1–1.2 V). Once a cell is placed in service, FIG. 9 demonstrates a six-fold improvement in voltage response time after the adhesive seal is removed for this invention versus cells of tradtional construction.

The following example clearly demonstrates that the performance of cells of the present invention is similar to that of cells constructed with air diffusion chambers containing blotter material and far superior to cells constructed such that the air cathode is placed directly on a flat container bottom.

EXAMPLE

A test series of 13 size zinc-air button cells were constructed in accordance with the following design specifications:

(A) Traditional Construction: i.e., stepped can, air chamber and porous mass in air chamber.
(B) Modified construction: i.e., air cathode placed directly on cell container bottom without grooves.
(C) Improved construction: i.e., air cathode placed directly on cell container bottom with grooves in accordance with the present invention.

These cells were tested for their current capability measured in milliamps (limiting current) at 1.1 volts both initially and after 60% depth of discharge. Table II gives the results of these tests.

TABLE II

| | Current Capability (mA/cell) of Size 13 Cells | | | | | | | | |
|---|---|---|---|---|---|---|---|---|---|
| | Initial Discharge | | | | 60% Depth of Discharge | | | | |
| | n | $\bar{X}$ | S.D. | Max. | Min. | n | $\bar{X}$ | S.D. | Max. | Min. |
| A | 10 | 6.85 | .667 | 7.6 | 6.0 | 10 | 5.93 | .529 | 6.8 | 4.9 |
| B | 10 | 6.66 | .542 | 7.5 | 5.8 | 10 | 2.17 | .408 | 2.8 | 1.6 |
| C | 10 | 6.64 | .490 | 7.5 | 6.0 | 10 | 5.46 | 1.39 | 7.7 | 3.9 |

As can be clearly seen from Table II, the initial performance of the three construction variations are quite similar. Cells without grooved cans (B), had the lowest minimum current capability. After 60% depth of discharge, however, the current capability of the (B) lot was reduced significantly, as compared to control. However, cells built in accordance with this invention (C) delivered essentially the same current at this depth of discharge as cells built in accordance with the traditional construction (A). The cell performance displayed in this example can be seen in other cell sizes and at essentially all levels of discharge.

While the present invention has been described in connection with a specific embodiment, it is understood that modifications and variations may be resorted to without departing from the spirit and scope of the invention. As those of normal skill in the art will readily appreciate such modifications and variations, together with other equivalent embodiments are within the purview and scope of the appended claims.

We claim:

1. In a button cell having air cathode assembly, a metallic anode and an electrolyte, said air cathode assembly, anode and electrolyte being housed in a cell assembly comprising an anode can, the open end thereof extending into a cathode can with a grommet compressed therebetween and wherein, when assembled, said cathode can includes at least one port in the bottom thereof communicating with the exterior of the cell, the improvement comprises:

(a) a plurality of grooves in at least one of:
  (1) the interior bottom face of said cathode
  (2) the face of said cathode assembly abutting said interior bottom face of said cathode in the vicinity of said at least one port
to thereby define gas diffusion passages communicating with said port and said cathode assembly at a plurality of loci remote from said port, said grooves, terminating at a perimeter within the perimeters of both said cathode assembly and said interior bottom face of said cathode can to thereby provide abutting, ungrooved peripheries; and
(b) an additional volume within said button cell, created by compressing said air cathode assembly and said cathode can together in a sealing configuration at said abutting ungrooved peripheries.

2. A button cell as in claim 1, wherein said grooves are on the interior face of the bottom of said cathode can.

3. A button cell as in claim 2, wherein said at least one port in said bottom of said cell is centrally located and at least part of said grooves radiate outwardly from said centrally located port.

4. A button cell as in claim 2, wherein said grooves are in a waffle pattern.

5. A button cell as in claim 2, wherein said grooves are of a depth of 0.0005 inches to 0.004 inches and a width of 0.001 inches to 0.005 inches.

6. A button cell as in claim 1, wherein the amount of time required for cell voltage to reach a functional level when said cell is initially placed into service has been reduced.

7. A button cell as in claim 1, wherein said additional volume comprises between 10% and 22% of the overall volume of said cell.

8. A button cell as in claim 1, wherein additional anodic material fills said additional volume.

9. A button cell as in claim 8, wherein said additional anode increases the capacity of said button cell.

10. In a method of manufacturing an air cathode button cell, of the type wherein an air cathode assembly, metallic anode and electrolyte are housed within a cell assembly comprised of an anode can, the open end thereof extending into a cathode can with a grommet compressed therebetween and wherein, upon manufacture, said cathode can includes at least one port in the bottom thereof communicating with the exterior of the cell, the improvement comprising:

(a) including a plurality of grooves in at least one of
  (1) the interior bottom face of said cathode can, and
  (2) the face of said cathode assembly abutting said bottom face of said cathode can in the vicinity of said at least one port
to thereby define gas diffusion passages communicating with said port and said cathode assembly at a plurality of loci remote from said port, said grooves, terminating at a perimeter within the perimeters of both said cathode assembly and said interior bottom face of said cathode can to thereby provide abutting, ungrooved peripheries; and (b) compressing said air cathode assembly and said cathode can together in a sealing configurating at said abutting ungrooved peripheries, thereby creating an additional volume within said button cell.

11. A method as in claim 10, wherein said grooves are included on the interior face of the bottom of said cathode can.

12. A method as in claim 11, wherein said at least one port in said bottom of said cell is located centrally and at least part of said grooves radiate outwardly from said centrally located port.

13. A method as in claim 10, wherein said grooves are included in a waffle pattern.

14. A method as in claim 10, wherein said grooves are between 0.0005 inches to 0.004 inches deep and 0.001 inches and 0.004 inches wide.

15. A method as in claim 10, wherein said additional volume comprises between 10% and 22% of overall volume of said cell.

16. A method as in claim 10, wherein additional anode material is placed within said additional volume.

17. A method as in claim 10, wherein said compressing of said air cathode assembly and said cathode can together at said ungrooved peripheries reduces the cost of manufacturing said cell.

18. A method as in claim 10, wherein said method reduces the time required for cell voltage to reach a functional level when said cell is initially placed into service.

* * * * *

UNITED STATES PATENT AND TRADEMARK OFFICE
CERTIFICATE OF CORRECTION

PATENT NO. : 4,591,539
DATED : May 27, 1986
INVENTOR(S) : Oltman, et al.

It is certified that error appears in the above—identified patent and that said Letters Patent is hereby corrected as shown below:

Col. 1, line 8, before "invention" insert --This--.

Col. 2, line 48, delete "draw back" and insert --drawback--.

Col. 3, line 8, after "tion" insert --is to--.

Col. 5, line 6, delete "has" and insert --have--.

Col. 5, line 63, after "appreciate" insert -- , --.

Col. 7, line 2, delete "configurating" and insert --configuration--.

Signed and Sealed this

Twenty-seventh Day of January, 1987

Attest:

DONALD J. QUIGG

Attesting Officer   Commissioner of Patents and Trademarks